Patented Apr. 21, 1953

2,635,991

UNITED STATES PATENT OFFICE 2,635,991

BONDED FILTER BLOCK, ITS PREPARATION AND USE

Southwick W. Briggs, Bethesda, Md.

No Drawing. Application July 9, 1948,
Serial No. 37,971

13 Claims. (Cl. 196—147)

This invention relates to a filter material, and more particularly to a porous block having adsorptive properties.

During the operation of machinery, particularly internal combustion engines, the lubricant employed to overcome friction between bearing surfaces becomes contaminated with gums, acids and moisture, resulting primarily from the oxidation of the lubricant. It is desirable to remove these materials from the lubricant in order that it may maintain its lubrication properties and to eliminate corrosion resulting from the presence of the impurities.

Filter materials consisting of loose beds of products having strong adsorptive properties were first provided for purification of the oil. These loose beds of filter material were not satisfactory because the fluid being filtered tended to channel through the filter bed. The flow of the fluid causes movement of the loose adsorbent particles during the filtration which results in their attrition and removal from the filter mass. The movement of the particles also results in classification of the adsorbent which in turn aggravates the channelling of the fluid passing through the filter mass.

Many of the objections listed above have been overcome by the use of adsorptive minerals, such as activated alumina bonded to form porous rigid blocks. Unfortunately, the bonded filters have not been as effective adsorbents as the loose material. Apparently, the bonding agent enters the capillaries in the adsorbent and thereby decreases their effectiveness.

A further objection to the porous filter blocks hitherto available has been the difficulty in handling the bonding agents used in the manufacture of the blocks. Generally, these materials have been highly corrosive and either strongly acidic or strongly alkaline. Moreover, the bonding agents, such as sodium silicate and aluminum phosphate, are very sticky and make automatic weighing, mixing, and forming difficult.

It is an object of this invention to provide a strong, porous filter block in which the adsorbent is bonded firmly in place.

Another object of this invention is to provide a porous strongly adsorbent filter block.

A further object of this invention is to provide a filter block which may be mechanically compounded in automatic machinery.

Still another object of this invention is to provide a strongly adsorbent filter medium which may be reactivated without loss of its adsorptive properties.

It is also an object of this invention to provide a filter block which may be prepared at a low cost.

With these and other objects in mind which will become apparent in the following detailed description, this invention resides in the preparation of a porous filter mass of an oxide of aluminum bonded with cement. The bonded mass is activated after the bonding operation to provide a porous material having strong adsorptive properties.

In the preparation of the porous, adsorbent filter blocks of this invention a hydrated oxide of aluminum, preferably in a dry condition, is first mixed with dry cement. While the aluminum oxide is preferably physically dry at the time of mixing with the cement, it should be in a hydrated, unactivated condition to obtain a finished product having maximum physical strength. Typical of the hydrated oxides which may be employed are bauxite and Grade C-40 aluminum hydrate distributed by the Aluminum Company of America. These materials contain approximately 30% volatile material which is largely removed during the activation.

The particle size of the hydrated oxide will depend on the characteristics desired in the finished filter block. For example, a particle size of 20–40 mesh on United States standard screens is satisfactory for the removal of moisture and solid particles from lubricating oil but does not impart a "polish" to the oil. If a hydrated aluminum oxide having a particle size of 60–100 mesh is used, lubricating oil filtered therethrough receives a high "polish."

The cement used in the bonding of the aluminum oxide is ordinary Portland cement used for construction purposes and throughout this description the term "cement" designates materials of that type. High early strength cements, such as Incor, may also be used and are preferred because of the short period required for initial set of the bond. A typical analysis of an Incor cement which has been used in the preparation of filter blocks is as follows:

| | |
|---|---|
| $SiO_2$ | 19.32 |
| $Al_2O_3$ | 6.54 |
| $Fe_2O_3$ | 2.74 |
| CaO | 63.30 |
| MgO | 3.26 |
| $SO_3$ | 2.87 |
| Loss | .98 |

The cement is mixed with the adsorbent material in amounts ranging from about 15 to 45% of the adsorbent. The minimum amount of cement will be determined by the minimum physical strength required by the porous block. Blocks prepared from a mixture containing 10% cement are too fragile to be handled commercially, and about 15% cement is the lowest concentration which may be used for most purposes.

If the concentration of the cement in the block is increased, no definite adverse effects upon the adsorption have been noted up to concentrations of as high as 45%. However, an increase in the cement decreases the porosity of the adsorbent block and a tendency for surface filtration arises. The total dirt capacity will then be decreased by the deposition of dirt on the surface and blocking of flow through adsorbent blocks containing high cement concentrations. Generally it is preferable to use mixes in which the cement amounts to about 20% of the hydrated aluminum oxide.

When activated alumina is bonded with cement, it is necessary to increase the concentration of the cement in order to provide an adsorbent block with sufficient physical strength. An adsorbent block prepared from a mix in which the weight of cement is about 30% of the weight of the activated alumina has sufficient strength to be used commercially, but must be handled carefully. No loss in adsorptive properties is noted when the alumina is activated prior to bonding. It will, however, be necessary to reactivate the adsorbent after bonding.

Sometimes difficulty is encountered in preparing adsorbent blocks having satisfactory strength from natural occurring bauxites. The bauxite may be washed with a 5% solution of sodium silicate and the washed material dried at 230-240° F. prior to bonding with cement to obtain a stronger product.

Both the hydrated oxide of aluminum and the cement are dry powders which may be easily handled in automatic weighing machinery without difficulty. These materials flow freely, are not sticky even after the addition of water, and may be completely removed from the apparatus without difficulty. This is in contrast with materials such as the acid aluminum phosphates or sodium silicate which are highly viscous and tacky and tend to build up on the equipment if they are used. Moreover, no serious safety or corrosion problems are encountered in the handling of aluminum oxide-cement mixtures.

Water, amounting to about 20% of weight of the aluminum oxide, is thoroughly mixed with the aluminum oxide and cement mixture. The water may be added to either of the solid materials before the solid materials are mixed, but it is generally desirable to handle the materials in a dry state during as much of the operations as possible. A reduction in the water content to about 10% of the weight of the aluminum oxide, while the amount of cement remains constant, results in a decrease in the strength and adsorptivity of the block. On the other hand, an increase in the amount of water to 30% causes only a slight reduction.

The wet mixture of the aluminum oxide and cement are then formed in any desired shape. The forming operation will usually consist of packing the mixture in molds in which the mixture is allowed to stand until initial set of the cement has occurred. The mixture may be packed in the mold by means of a press, vibrating table or any other suitable apparatus. If the mixture is packed in the mold by means of a vibrating table and high-early-strength cement has been employed in the preparation of the mix, a setting period of approximately six hours is sufficient to allow the blocks to be handled without breakage or smearing of their surface on handling. In most instances the blocks are aged for three days after being removed from the mold before activation.

The bonded filter block of hydrated aluminum oxide and cement is activated by heating to temperatures ranging from about 600° F. to about 900° F. The blocks are sufficiently stable and strong to be heated directly from room temperature to 450° F. The blocks may be heated to the higher temperatures required for activation at a rate of 100° F. per hour without danger of cracking. No ceramic heating schedule is necessary in the activation procedure, but the blocks should be maintained at the activation temperature for a period sufficient to heat the entire mass of the block.

The particular temperature to which the block is heated for activation will depend upon the purposes for which it is to be used. If the filter block is primarily to adsorb moisture it may be heated to the temperature of approximately 600° F. for about one hour. This temperature is sufficient to eliminate the volatile material from bauxite and aluminum hydrate to form a porous structure having excellent adsorptive characteristics. On the other hand, if the filter block is to be used in the clarification of lubricating oils it is preferably heated to temperatures in the neighborhood of 900° F. A block heated to the higher temperature is very effective in removing asphaltenes from the oil.

The porous filter block prepared according to this invention is extremely effective as an adsorbent as well as a mechanical filter and has a strong stripping action as compared with other adsorbents. For example, in tests on a refrigerant containing fifteen to twenty parts per million water treated with loose, activated silica gel, the water content was reduced to approximately five parts per million. The water content of this same refrigerant containing fifteen to twenty parts per million and treated with loose activated alumina was reduced to approximately one part per million. If the alumina is bonded with cement in the manner described herein, the stripping capacity of the alumina is unimpaired and the bonded filter medium also reduced the water content of the refrigerant to approximately one part per million. On the other hand, alumina bonded with sodium silicate or acid aluminum phosphates and then activated, reduced the water content of the refrigerant to approximately two and one and one-half parts per million, respectively.

The filter medium prepared according to this invention possesses important advantages over prior bonded adsorbents in respect to its total capacity as well as its effectiveness in stripping. Actually, the total capacity of the alumina bonded with cement is higher than the capacity of alumina in the loose form. Tests were run in which filter blocks bonded with acid aluminum phosphate, sodium silicate, and several concentrations of cement were exposed to an atmosphere of 98% relative humidity at approximately 20° C. The amount of water adsorbed by the blocks was determined by their increase in weight and is presented in the following table as per cent of the weight of the block. For purposes of the test, all of the test specimens were heated to 450°

F. and cooled to room temperature immediately before being exposed to the humid atmosphere:

| Absorbent | Activation Temperature, °F. | Moisture Adsorbed—Percent of weight of Adsorbent | | | | | |
|---|---|---|---|---|---|---|---|
| | | Hours of Exposure | | | | | |
| | | 7½ | 24 | 48 | 72 | 96 | 208 |
| Loose aluminum hydrate | 900 | 3.1 | 5.6 | 7.7 | 9.4 | 10.7 | 14.9 |
| Aluminum hydrate bonded with aluminum phosphate | 900 | 3.3 | 6.2 | 8.1 | 10.7 | 10.9 | 10.8 |
| Aluminum hydrate bonded with sodium silicate | 900 | 1.3 | 2.9 | 4.2 | 5.7 | 5.9 | 9.5 |
| Aluminum hydrate bonded with 15% cement | 900 | 2.1 | 6.6 | 8.2 | 10.9 | 12.9 | 20.5 |
| Aluminum hydrate bonded with 20% cement | 900 | 4.5 | 8.8 | 9.6 | 11.3 | 14.9 | 16.5 |
| Aluminum hydrate bonded with 25% cement | 900 | 2.1 | 4.3 | 6.6 | 8.5 | 10.5 | 13.0 |
| Loose aluminum hydrate | 650 | 1.3 | 6.5 | 8.6 | 8.7 | 9.3 | 11.3 |
| Aluminum hydrate bonded with aluminum phosphate | 650 | 2.3 | 5.5 | 7.5 | 8.9 | 10.2 | 10.9 |
| Aluminum hydrate bonded with sodium silicate | 650 | 1.5 | 2.9 | 3.8 | 5.5 | 6.0 | 9.6 |
| Aluminum hydrate bonded with 15% cement | 650 | 2.2 | 5.7 | 8.9 | 11.4 | 13.5 | 17.5 |
| Aluminum hydrate bonded with 20% cement | 650 | 3.1 | 6.5 | 8.6 | 11.4 | 12.9 | 16.1 |
| Aluminum hydrate bonded with 25% cement | 650 | 2.2 | 5.7 | 8.7 | 10.9 | 11.9 | 15.8 |

The test specimen of loose aluminum hydrate was prepared by activating the loose material at the temperatures indicated in the table and then placing it in a perforated metal cylinder three inches long and two inches in diameter.

The aluminum phosphate bonded aluminum hydrate was prepared by mixing aluminum hydrate with 22¼% of its weight of aluminum phosphate for a period of twenty minutes. The aluminum hydrate and aluminum phosphate mixture was molded to form a test specimen three inches long and two inches in diameter. The molded test specimens were fired at 650° F. and at 900° F. for two hours for the two tests. The specimens were fired within eight hours after the molding operation.

The test specimens in which aluminum hydrate was bonded with sodium silicate were prepared by mixing the aluminum hydrate with 20% of its weight of a C brand of sodium silicate for ten minutes. The mixture was then molded to form a test specimen three inches long and two inches in diameter. The test specimens were fired at 650° F. and at 900° F. for two hours within eight hours after their fabrication.

One of the cement bonded test specimens was prepared by mixing Grade C-40 aluminum hydrate with 15% of its weight of Incor high-early-strength Portland cement for two minutes. Water amounting to 20% of its weight of aluminum hydrate was added to the dry mix and the mixing continued for five minutes. Test specimens three inches long and two inches in diameter were formed. These test specimens were aged for seventy-two hours and then fired at 650° F. and at 900° F. for two hours for the two tests. The test specimens containing 25% cement and 20% cement were prepared in exactly the same manner except for the proportion of the cement. The aluminum hydrate had a screen analysis on United States standard sieves as follows:

|  | Per cent |
|---|---|
| +20 | .99 |
| Thru 20 on 35 | 56.17 |
| Thru 35 on 45 | 27.71 |
| Thru 45 on 50 | 7.09 |
| Thru 50 on 60 | 5.24 |
| Thru 60 on pan | 2.80 |
| | 100.00 |

It will be seen that the total capacity of the adsorbent material bonded with cement was higher than that of the loose material in all instances. Whereas the bonding of loose aluminum hydrate with sodium silicate or acid alumina phosphate results in the decrease of the capacity of the adsorbent, the bonding with cement actually increases the total capacity of the porous filter mass. Apparently, the cement has adsorptive properties which are added to the adsorptive properties of the activated aluminum in this novel adsorbent material.

When the specimens used in the tests set forth in the table above were reactivated by heating to activation temperatures, cement-bonded blocks regained their capacity for adsorbing moisture. One sample has been reactivated fourteen times and continues to follow the initial absorption curve. Apparently the increased absorption is not the result of absorption of water of crystallization by the cement during its initial set. The filter medium herein described may, therefore, be periodically removed from service, reactivated, and returned to service without losing its effectiveness.

The novel filter medium of this invention is superior to the materials hitherto available in several important aspects. The stripping ability, as well as the total adsorptive capacity of the new material, is superior to the bonded filter materials of the prior art. In addition, important reductions in the cost of manufacturing porous filter blocks having adsorptive properties are made possible by the ease with which the materials may be handled as well as the low cost of the raw materials.

While this invention has been described in detail with reference to specific examples, it is to be understood that the invention is not limited to those details but falls within the scope of the appended claims.

I claim:
1. A filter medium comprising a thermally activated bonded composition, said composition comprising about 65-85% hydrated oxide of aluminum bonded with about 15-35% Portland cement.
2. A filter medium comprising a thermally activated bonded composition, said composition comprising about 65-85% bauxite bonded with about 15-35% Portland cement.
3. A filter medium comprising a thermally acti- vated bonded composition, said composition comprising about 65–85% aluminum hydrate bonded with about 15–35% Portland cement.

4. A method of making a filter block comprising mixing a hydrated oxide of aluminum with Portland cement and water in proportions of about 15 to 45 parts of Portland cement to 100 parts of hydrated oxide of aluminum, forming the mixture in the desired shape of the block, and heating the formed block to temperatures sufficient for activation of the filter block.

5. A method of making a filter block comprising mixing a hydrated oxide of aluminum with Portland cement in proportions of about 15 to 45 parts of Portland cement to 100 parts of hydrated oxide of aluminum, adding water to the dry mixture forming the wet mix in a block of the desired shape, storing the block to set the cement partially, and heating the set block to temperatures sufficient for activation of the hydrated oxide of aluminum.

6. A method of making a filter block comprising mixing hydrated aluminum oxide with about 15–45% of its weight of Portland cement, adding water in the amount of about 20% of the weight of the aluminum oxide, forming the mixture in a block of the desired shape, and heating the block to a temperature of about 600–900° F. to activate the block.

7. A method of making a filter block comprising mixing a hydrated oxide of aluminum with about 15–45% of its weight of Portland cement and about 20% of its weight of water, forming a block of the desired shape of the wet mixture, storing the block whereby the cement is partially set, and activating the block by heating to a temperature of about 600–900° F. for a period of about one hour.

8. As a new composition of matter, a hydrated aluminum oxide bonded with Portland cement, said aluminum oxide and Portland cement being in proportions of about 15 to 45 parts of Portland cement to 100 parts of aluminum oxide, said bonded aluminum oxide being heated to a temperature of about 600–900° F. after bonding.

9. An adsorptive monolithic filter medium comprising thermally activated hydrated oxide of aluminum bonded with Portland cement, said cement being present in amounts ranging from about 15 to 35 per cent of the composition.

10. An adsorbent monolithic filter medium comprising thermally activated aluminum hydrate bonded with Portland cement, said cement being present in amounts ranging from about 15 to 35 per cent of the composition.

11. A method of clarifying lubricating oils to remove moisture and impurities therefrom, comprising passing the lubricating oil through a monolithic porous block of finely divided particles of a hydrated aluminum oxide bonded with Portland cement, said aluminum oxide and Portland cement being in proportions of about 100 parts of aluminum oxide to about 15 to 45 parts of Portland cement, said block being activated by heating to a temperature of about 600 to 900° F.

12. A method of making a filter block comprising mixing a hydrated oxide of aluminum with Portland cement and water in proportions of about 15 to 45 parts of water and cement to 100 parts of hydrated oxide of aluminum, forming the mixture in the desired shape of the block, and activating the thus formed block by heating to a temperature of about 600 to 900° F.

13. A method of making a filter block comprising mixing a hydrated oxide of aluminum with Portland cement in proportions of about 15 to 45 parts of Portland cement to 100 parts of hydrated oxide of aluminum, adding water to the dry mixture, forming the wet mix in a block of the desired shape, stirring the block to set the cement partially, and activating the set block by heating to a temperature of about 600 to 900° F.

SOUTHWICK W. BRIGGS.

References Cited in the file of this patent

UNITED STATES PATENTS

| Number | Name | Date |
|---|---|---|
| 1,856,141 | Stark | May 3, 1932 |
| 2,007,052 | Howe | July 2, 1935 |
| 2,067,920 | Heuser | Jan. 19, 1937 |
| 2,249,681 | Briggs et al. | July 15, 1941 |
| 2,292,632 | Greger | Aug. 11, 1942 |